(12) United States Patent
Vollmann et al.

(10) Patent No.: US 10,508,707 B2
(45) Date of Patent: Dec. 17, 2019

(54) BEARING SYSTEM

(71) Applicants: AUDI AG, Ingolstadt (DE);
Vibracoustic GmbH, Darmstadt (DE)

(72) Inventors: Stefan Vollmann, Ingolstadt (DE);
Christian Meyer, Gammelsdorf (DE);
Thomas Schemer, Weinheim (DE);
Timo Stöcker, Hemsbach (DE)

(73) Assignees: AUDI AG, Ingolstadt (DE);
VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 15/766,999

(22) PCT Filed: Oct. 12, 2016

(86) PCT No.: PCT/EP2016/001689
§ 371 (c)(1),
(2) Date: Apr. 9, 2018

(87) PCT Pub. No.: WO2017/063736
PCT Pub. Date: Apr. 20, 2017

(65) Prior Publication Data
US 2018/0291978 A1    Oct. 11, 2018

(30) Foreign Application Priority Data

Oct. 12, 2015  (EP) .................................. 5189374
Nov. 28, 2015  (DE) .................... 10 2015 015 487

(51) Int. Cl.
*F16F 13/10*    (2006.01)
*F16F 13/26*    (2006.01)

(52) U.S. Cl.
CPC .......... *F16F 13/106* (2013.01); *F16F 13/105* (2013.01); *F16F 13/26* (2013.01); *F16F 2226/045* (2013.01)

(58) Field of Classification Search
CPC ....... F16F 13/102; F16F 13/105; F16F 13/106
(Continued)

(56) References Cited

U.S. PATENT DOCUMENTS 4,783,063 A * 11/1988 Probst .................. F16F 13/105
267/140.13
4,840,358 A *  6/1989 Hoying .................. F16F 13/20
248/566

(Continued)

FOREIGN PATENT DOCUMENTS

| CN | 101688582 A | 3/2010 |
|----|-------------|--------|
| CN | 108138891 A | 6/2018 |

(Continued)

OTHER PUBLICATIONS

Notification of Transmittal of Translation of the International Preliminary Report on Patentability dated Apr. 26, 2018, in connection with corresponding international Application No. PCT/EP2016/001689 (8 pgs.).

(Continued)

*Primary Examiner* — Thomas J Williams
(74) *Attorney, Agent, or Firm* — Maier & Maier, PLLC

(57) ABSTRACT

A bearing system, for bearing a motor vehicle assembly at a motor vehicle body, with a fluid operating chamber that is in flow connection, by way of at least one fluid channel, with a fluid equilibration chamber, which is present in a housing of the bearing system. The fluid operating chamber and the fluid equilibration chamber are separated by a separating element, in which the at least one fluid channel is present. The separating element is decoupled from the housing by an elastic element, which surrounds the separating element in the peripheral direction. The housing has a cover, which (Continued)

accommodates the fluid equilibration chamber, and a supporting part, which holds a spring element of the bearing system.

8 Claims, 2 Drawing Sheets

(58) Field of Classification Search
USPC ............ 267/140.11, 140.13, 140.14, 140.15
See application file for complete search history.

(56) References Cited

U.S. PATENT DOCUMENTS

| | | | |
|---|---|---|---|
| 4,901,986 A | 2/1990 | Smith | |
| 5,516,084 A | 5/1996 | Rizzo | |
| 5,571,263 A * | 11/1996 | Koester | F16F 13/10 267/140.13 |
| 6,412,760 B2 * | 7/2002 | Shimoda | F16F 13/105 267/140.13 |
| 6,755,401 B2 | 6/2004 | Akasa et al. | |
| 7,494,115 B2 | 2/2009 | Maeno et al. | |
| 9,878,604 B2 * | 1/2018 | Furusawa | F16F 13/105 |
| 10,316,927 B2 * | 6/2019 | Schemer | F16F 13/106 |
| 2004/0245690 A1 * | 12/2004 | Winkler | G16F 13/108 267/140.13 |
| 2018/0223945 A1 | 8/2018 | Audi et al. | |

FOREIGN PATENT DOCUMENTS

| | | |
|---|---|---|
| DE | 38 28 132 A1 | 3/1989 |
| DE | 38 29 907 A1 | 3/1989 |
| DE | 38 01 108 A1 | 7/1989 |
| DE | 41 00 370 C1 | 6/1992 |
| DE | 10 2005 012 964 A1 | 10/2005 |
| DE | 602 14 982 T2 | 5/2007 |
| DE | 10 2007 049 794 A1 | 5/2008 |
| DE | 10 2007 058 191 A1 | 6/2008 |
| EP | 0 142 943 A2 | 5/1985 |
| EP | 0 737 825 A1 | 10/1996 |
| EP | 2 503 181 A1 | 9/2012 |
| EP | 3032136 A1 | 6/2016 |
| JP | H10-274279 A | 10/1998 |
| WO | WO-2007065761 A1 * | 6/2007 ............ F16F 13/103 |

OTHER PUBLICATIONS

Office Action dated Sep. 11, 2019, in corresponding European Application No. 16 805 969.9; including partial machine-generated English language translation; 12 pages.
Chinese Office Action dated Mar. 21, 2019, in connection with corresponding CN Application No. 201680059431.2 (14 pgs., including English translation).
Written Opinion of the International Search Authority dated Mar. 13, 2017 of corresponding International application No. PCT/EP2016/001689; 9 pgs.
International Search Report dated Mar. 13, 2017 of corresponding International application No. PCT/EP2016/001689; 9 pgs.
European Search Report dated Mar. 23, 2016 of corresponding European application No. 15 18 9374; 2 pgs.
Heißing Bernd, al., "Fahrwerkhandbuch", Springer Vieweg Verlag, 2013, p. 485-489; 56 pages including English-language translation.
German Examination Report dated Jul. 27, 2016 corresponding German No. 10 2015 015 487.7; 14 pages including English-language translation.
Office Action dated Sep. 30, 2019, in corresponding Chinese Application No. 201680059431.2; 17 pages.

* cited by examiner

BEARING SYSTEM

FIELD

Embodiments of the invention relate to a bearing system, in particular for bearing a motor vehicle assembly at a motor vehicle body, with a fluid operating chamber that is in flow connection, by way of at least one fluid channel, with a fluid equilibration chamber, which is present in a housing of the bearing system, wherein the fluid operating chamber and the fluid equilibration chamber are separated by a separating element, in which the at least one fluid channel is present.

The invention relates to a bearing system, in particular for bearing a motor vehicle assembly at a motor vehicle body, with a fluid operating chamber that is in flow connection, by way of at least one fluid channel, with a fluid equilibration chamber, which is present in a housing of the bearing system, wherein the fluid operating chamber and the fluid equilibration chamber are separated by a separating element, in which the at least one fluid channel is present.

BACKGROUND

The bearing system serves for damping the bearing of a motor vehicle assembly of an internal combustion engine, for example, at another system, preferably the motor vehicle body. In this respect, the bearing system can also be referred to as a damping system. It can be provided that the bearing system is fastened to an auxiliary frame, which is also referred to as a subframe and, in turn, is fastened to a supporting structure of the motor vehicle body. The auxiliary frame, together with the supporting structure, can constitute the motor vehicle body. Therefore, the motor vehicle assembly is connected or can be connected via the bearing system to the auxiliary frame and accordingly to the motor vehicle body.

If the bearing system is provided for bearing the internal combustion engine at the motor vehicle body, then the term engine mount is also conventionally used. In the following, only the use of the bearing system as an engine mount is addressed, that is, the use for bearing the motor vehicle assembly or the internal combustion engine at the motor vehicle body. Obviously, however, the bearing system can also be provided for other intended purposes, wherein the statements made below can also be applied in an analogous way.

The motor vehicle assembly is fastened via the bearing system to the motor vehicle body; in particular, the motor vehicle assembly braces itself against the motor vehicle body via the bearing system. Here, the bearing system is arranged between the motor vehicle assembly and the motor vehicle body in such a way that it is forced in the direction of the motor vehicle body by the influence of gravity acting on the motor vehicle assembly. Preferably provided is not only a single bearing system for bearing the motor vehicle assembly, but rather a plurality of bearing systems, which are designed identically or at least analogously to the described bearing system.

The bearing system comprises the fluid operating chamber as well as the fluid equilibration chamber. They are in flow connection with each other by way of the fluid channel. Preferably, the fluid operating chamber is present in the operative connection between the motor vehicle assembly and the motor vehicle body. This means that the motor vehicle assembly is braced against the motor vehicle body by way of the fluid operating chamber or the fluid present in it. In this case, when the motor vehicle assembly is shifted in position on account of vibrations, for example, the volume of the fluid operating chamber changes.

When there is a reduction in volume, the fluid present in the fluid operating chamber is forced out of the fluid operating chamber into the fluid equilibration chamber via the fluid channel. If, in contrast, the volume increases, then the fluid can flow out of the fluid equilibration chamber back into the fluid operating chamber via the fluid channel. The bearing system serves for the vibration-damping bearing of the motor vehicle assembly and is therefore intended to suppress or at least to damp the transmission of vibrations from the motor vehicle assembly to the motor vehicle body. For this purpose, at least one throttle can be present in the fluid channel, so that the damping behavior of the bearing system can be adjusted by means of the throttle.

The volume of the fluid equilibration chamber is not arranged or at most is arranged to a minor extent in the operative connection between the motor vehicle assembly and the motor vehicle body. For example, for this purpose, the fluid equilibration chamber is present in the housing of the bearing system, wherein, in particular, the housing is rigid. It can indeed be provided that the motor vehicle assembly is braced against the motor vehicle body by way of the housing, but, on account of the rigid design, the weight of the motor vehicle assembly does not bring about, at least not directly, any change in the volume of the fluid equilibration chamber.

SUMMARY

The object of the invention is then to propose a bearing system that has advantages in comparison to known bearing systems and, in particular, enables a reliable damping of vibrations of the motor vehicle assembly with, at the same time, low construction costs and better adjustability of the damping behavior of the bearing system.

It is provided here that the separating element is decoupled from the housing by means of an elastic element, which surrounds the separating element in the peripheral direction, wherein the housing has a cover, which accommodates the fluid equilibration chamber, and a supporting part, which holds a spring element of the bearing system, wherein the cover engages between the supporting part and the elastic element in such a way that, as viewed in the radial direction with respect to a central longitudinal axis of the bearing system, the elastic element, the cover, and the supporting part follow one another in succession.

The separating element separates the fluid operating chamber from the fluid equilibration chamber and, in addition, comprises the at least one fluid channel, by way of which the fluid operating chamber and the fluid equilibration chamber are in flow connection with each other. In this regard, the separating element is present between the fluid operating chamber and the fluid equilibration chamber. For producing the fluid connection between the fluid operating chamber and the fluid equilibration chamber, at least one fluid channel is formed in the separating element. Obviously, it can also alternatively be provided that the fluid channel is formed by the separating element or that the separating element co-forms the fluid channel, at least in some regions. The separating element is preferably arranged in the housing or at least at the housing. For example, the separating element is fastened to the housing.

The fluid channel can be designed in the form of a nozzle, at least in some regions, or can be present in its entirety as a nozzle. For example, the fluid channel is round in cross section along its entire longitudinal extent. Additionally or alternatively, it can be straight over the entire longitudinal extent or curved, at least in some segments. For example, at its end that opens into the fluid operating chamber and/or at its end that opens into the fluid equilibration chamber, the fluid channel has a widening, so that the diameter of the fluid channel increases in the direction of the fluid operating chamber and/or in the direction of the fluid equilibration chamber.

The separating element is positioned, for example, perpendicular or at least nearly perpendicular to a central longitudinal axis of the bearing system. It is arranged in a floating manner in the housing of the bearing system or it is mounted in the housing of the bearing system. This means that the separating element can shift in position at least slightly with respect to the housing, in particular with respect to the central longitudinal axis of the bearing system, in the radial direction and/or in the axial direction. Provided for this purpose is the elastic element, which preferably completely surrounds the separating element in the peripheral direction with respect to the central longitudinal axis.

In this respect, it is provided that the separating element is arranged spaced apart from the housing or from the housing walls of the housing; that is, the separating element does not come into physical contact with the housing or the housing walls. The elastic element is provided for spacing the separating element apart from the housing. For example, in the peripheral direction, the elastic element is positioned continuously between the separating element and the housing or the housing walls and holds the separating element at a distance from the housing or housing walls. Utilized as a separating element is, for example, a bellows, in which the fluid equilibration chamber is formed, at least in some regions and, in particular, in its entirety. For example, the fluid equilibration chamber is bounded by the elastic element or the bellows, on the one hand, and by the separating element, on the other hand. For this purpose, the elastic element can be connected to the separating element in a fluid-tight manner or the elastic element can be fastened to the separating element.

Preferably, the cover and/or the separating element is/are composed of a rigid material or of rigid materials. This means that the separating element forces the elastic element outward in the radial direction in the direction of the cover, whereas the cover, in turn, forces the elastic element inward in the radial direction in the direction of the separating element. As a result of the arrangement of the elastic element between the cover and the separating element, the latter is decoupled from the housing and, in particular, from the cover. At the same time, however, a reliable fastening of the elastic element is achieved, namely, in that it is fastened between the cover and the separating element at least in a force-fitting manner. Additionally, a form-fitting connection between the elastic element and the cover, on the one hand, and/or the separating element, on the other hand, can be provided.

It is further provided that the housing is equipped with the cover and the supporting part, wherein the cover engages between the supporting part and the elastic element. The cover serves for accommodating the fluid equilibration chamber and/or the elastic element. In this case, the cover can have a projection, in particular, a central projection, which engages in the annular shape of the fluid equilibration chamber. For example, the projection extends all the way to the separating element. Especially preferred, the elastic element is held by clamping between the cover and the separating element. Additionally or alternatively, a form-fitting connection can be provided.

The supporting part serves, for example, for linking or fastening of a first bearing point, to which the motor vehicle assembly can be fastened. For example, the first bearing point is linked via the spring element, which is, in particular, an elastomeric element. The supporting part is designed for bracing or holding the spring element. The spring element is thus fastened by means of the supporting part. For example, the spring element is cast, or injection-molded on the supporting part. The supporting part is preferably composed of a stiffer material than the spring element, in particular, of metal, preferably steel.

For example, the first bearing point is present at a bearing cap, which comprises the spring element, in particular the elastomeric element. The spring element is preferably connected to the first bearing point by way of a bearing core. Obviously, however, the first bearing point can also be present directly at the spring element. For example, the bearing core is taken up in the spring element and, in particular, is cast in it. In this way, a reliable holding of the first bearing point with respect to the spring element is achieved. The spring element, together with the separating element, bounds the fluid operating chamber. For example, the spring element has a recess, which the separating element engages over or closes. The spring element can surround the separating element laterally, so that, for example, it is arranged overlapping with the cover, as viewed in the axial direction.

In order to create a durable and stable fastening of the cover at the supporting part, the cover should engage between the supporting part and the elastic element. In this case, the cover preferably rests, on the one hand, against the supporting part, and, on the other hand, against the elastic element, in particular, outward in the radial direction against the supporting part and inward in the radial direction against the elastic element. As viewed in the radial direction with respect to the central longitudinal axis of the bearing system, therefore, the elastic element, the cover, and the supporting part follow one another in succession, in particular directly in succession.

This means, in particular, that, as viewed in the axial direction, the elastic element, the cover, and the supporting part overlap one another, that is, are each arranged in some regions at the same axial position with respect to the central longitudinal axis. In this case, the three mentioned elements lie in an imaginary plane that is situated perpendicular to the central longitudinal axis of the bearing system. The connection between the cover and the supporting part can be present as a form-fitting connection. For example, when the bearing system is assembled, the supporting part is flanged, so that it engages behind a region of the cover. This region is preferably provided on the side of the supporting part that faces away from the spring element.

In another embodiment of the invention, it is provided that the elastic element, together with the separating element, encloses the fluid equilibration chamber. Reference to this has already been made above. The fluid equilibration chamber is, for example, annular in shape, or at least approximately annular in shape. It is bounded, on its inner-lying side in the radial direction and on its outer-lying side in the radial direction, by side walls of the elastic element, wherein the side walls of the elastic element are connected to one another by a bottom part of the elastic element. The elastic element has, for example, at least to an approximation, the shape of a rotational element, for which a U shape is rotated around a central axis, preferably the central longitudinal axis of the bearing system.

The separating element is arranged at or fastened to the elastic element on the side of the elastic element that lies opposite to the bottom part, so that the elastic element and the separating element together enclose the fluid equilibration chamber. Here, the elastic element is preferably connected to the separating element in a fluid-tight manner, so that fluid can flow out of or into the fluid equilibration chamber only through the at least one fluid channel.

In the scope of another embodiment of the invention, it is provided that the separating element is fastened to the housing by way of the elastic element. In this regard, by means of the separating element, not only the decoupling of the separating element is achieved, but, in addition, a fastening of the separating element to the housing is achieved. In this respect, by way of the elastic element, there is a retaining connection between the separating element and the housing. Especially preferred, the separating element is fastened to the housing exclusively by way of the elastic element and is therefore arranged spaced apart continuously from the housing or housing walls.

Another preferred embodiment of the invention provides that the spring element is fastened, by way of the supporting part, in a guide recess of a guide device, wherein the supporting part engages between the guide device and the cover in such a way that, as viewed in the radial direction with respect to the central longitudinal axis, the elastic element, the cover, the supporting part, and the guide device follow one another in succession. In this case, the supporting part preferably rests, on the one hand, against the cover and, on the other hand, against the guide device, in particular outward in the radial direction against the guide device and inward in the radial direction against the cover.

It is therefore provided, for example, that, as viewed in the axial direction, the elastic element, the cover, the supporting part, and the guide device overlap; that is, they are each arranged in some regions at the same axial position with respect to the central longitudinal axis. In this respect, the four mentioned elements lie in the imaginary plane that is situated perpendicular to the central longitudinal axis of the bearing system. Additionally, a corresponding arrangement can also be provided for the separating element, so that, overall, five elements are arranged in the imaginary plane, that is, overlap one another in the axial direction.

An enhancement of the invention provides that the elastic element is arranged between the cover and the supporting part, and, in particular, is held in a clamped manner. For example, as viewed in the axial direction, the elastic element lies between the cover and the supporting part, in particular, between a free end of the cover and a contact surface of the supporting part. The contact surface is formed, for example, by a region of the supporting part that is directed or bent outward in the radial direction. Preferably, as viewed in the axial direction, the elastic element rests, on the one hand, against the cover, and, on the other hand, against the supporting part, in particular against the contact surface. It can be clamped between them, that is, held by them in a force-fitting manner.

Another embodiment of the invention provides that the supporting part engages over the cover in the axial direction in some regions and is fastened to the cover in a form-fitting manner. Reference to this has already been made above. The fastening of the supporting part to the cover in a form-fitting manner can be produced, for example, through a flanging of the supporting part. Especially preferred, the supporting part and, in particular, the flanging rests directly against the cover. In this regard, there is no additional element provided between the supporting part and the cover.

Another preferred embodiment of the invention provides that the elastic element has a separating-element receiving groove for the separating element. The separating-element receiving groove is preferably formed continuously in the peripheral direction, so that the separating element is likewise arranged continuously in the peripheral direction. However, the separating-element receiving groove can also be discontinuous and in this respect, is composed of a plurality of groove segments that are spaced apart from one another. By use of the separating-element receiving groove, a connection of the separating element to the elastic element is produced in a form-fitting manner. In this case, the separating-element receiving groove is preferably designed in such a way that a shift in position of the separating element in the axial direction with respect to the elastic element is prevented, in particular through the creation of a form-fitting connection.

For example, in another embodiment of the invention, it is provided that the separating element has a first part and a second part, wherein the two parts are fastened to each other and/or both of them engage in the separating-element receiving groove. In this respect, the separating element is multipart in design and has at least the first part and the second part. These can be fastened to each other; for example, they are riveted to each other. For this purpose, preferably rivet projections of the first part pass through the second part and are expanded on the side of the second part facing away from the first part, by pressing or peening, for example, so that the two parts are connected reliably to each other.

Additionally or alternatively, it is provided that the two parts engage in the separating-element receiving groove. Said receiving groove is provided in such a way, for example, that the two parts are forced onto each other in the axial direction. Accordingly, through the engagement in the separating element receiving groove, the two parts are each subjected to a force that presses each part in the direction of the other respective other part, so that the two parts preferably rest against each other, at least in some regions.

Another preferred embodiment of the invention provides that an elastic membrane is fastened to the separating element, and, in particular, is held by clamping between the first part and the second part and separates a fluid damping chamber rheologically from the fluid operating chamber, wherein the fluid damping chamber is in flow connection with an outer surrounding of the bearing system by way of a throttle channel. Besides the fluid operating chamber and the fluid equilibration chamber, the bearing system is equipped with the fluid damping chamber. Preferably, the fluid damping chamber is separated completely or at least nearly completely rheologically from the fluid operating chamber and/or from the fluid equilibration chamber. This means that the fluid from the fluid operating chamber and/or the fluid equilibration chamber cannot enter into the fluid damping chamber, and vice versa. For this purpose, the elastic membrane is arranged between the fluid operating chamber and the fluid damping chamber, which is fluid-tight or at least nearly fluid-tight.

If low-frequency vibrations of the internal combustion engine arise, in particular with large amplitude or large vibrational energy, then the fluid can flow out of the fluid operating chamber via the fluid channel in the direction of the fluid equilibration chamber, or vice versa. Consequently, by use of the flow connection between the fluid operating chamber and the fluid equilibration chamber, such low-frequency vibrations are reliably damped. Because, in the case of these vibrations, the membrane is deflected strongly in the direction of the fluid damping chamber, a high pressure can arise in the fluid damping chamber.

Because, due to the high pressure, an undesired noise generation can occur, it is possible in a preferred embodiment of the invention to provide a throttle channel, by way of which a pressure equilibration between the fluid present in the fluid damping chamber and the outer surroundings can occur. The throttle channel is optional, however. By way of the throttle channel, the fluid damping chamber is in flow connection with the outer surroundings of the bearing system. A design of this kind has the advantage that, by means of the elastic membrane and/or the fluid present in the fluid damping chamber, an efficient damping of even high-frequency vibrations of the internal combustion engine can be achieved, without the occurrence of the mentioned noise generation. In addition, a cross-section adjusting element can be associated with the throttle channel, by means of which the through-flow cross section of the throttle channel can be adjusted. The cross-section adjusting element is present, for example, in the form of a control valve, or the like. In this case, the control valve can be designed as a discretely switching control valve or as a proportional valve.

The elastic membrane is fastened to the separating element. For this purpose, it engages in the separating element, for example, at least in some regions, so that it is held at it in a form-fitting manner and/or in a force-fitting manner. If the separating element is multipart in design and, in this respect, has at least the first part as well as the second part, then the elastic membrane can be held by clamping between the first part and the second part. Situated in the first part, which is preferably arranged in or fastened to the housing, is the at least one fluid channel. The second part of the separating element is fastened to the first part and preferably engages over it on the side of the fluid operating chamber. For example, the second part of the separating element is arranged here in such a way that it forces the membrane in the direction of the first part or fixes the membrane to it. For example, both the first part and the second part of the separating element each have a recess, in which the membrane or an edge projection of the membrane respectively engages.

Finally, in the scope of another embodiment of the invention, it can be provided that the fluid damping chamber is arranged in the separating element. A design of the bearing system that is efficient in terms of installation space is thereby achieved. For example, for the creation of the fluid damping chamber, the separating element has a depression, which is open in the direction of the fluid operating chamber. The membrane then engages over the fluid damping chamber or the depression completely, so that the fluid damping chamber is separated rheologically from the fluid operating chamber.

Additionally or alternatively, in another embodiment of the invention, it can be provided that a first bearing point, in particular, for the motor vehicle assembly, is arranged at a bearing cap, which bounds the fluid operating chamber together with the separating part, and/or a second bearing point, in particular, for the motor vehicle body, is/are connected to the housing. In this case, the damping effect of the bearing system is present between the first bearing point and the second bearing point. Preferably, the motor vehicle assembly is connected to the first bearing point and the motor vehicle body is connected to the second bearing point, in particular directly. The first bearing point is present at the bearing cap, which bounds the fluid operating chamber, at least in some regions, in particular together with the separating element. For example, for this purpose, the bearing cap has a recess, which constitutes the fluid operating chamber and which is closed by the separating element. In contrast, the second bearing point can be connected to the housing, preferably rigidly.

The invention also obviously relates to a motor vehicle having a motor vehicle assembly, a motor vehicle body, as well as a bearing system, by way of which the motor vehicle assembly is mounted at the motor vehicle body, wherein the bearing system has a fluid operating chamber, which is in flow connection, by way of at least one fluid channel, with a fluid equilibration chamber that is present in a housing of the bearing system, wherein the fluid operating chamber and the fluid equilibration chamber are separated by a separating element, in which the at least one fluid channel is present. In this case, it is provided that the separating element is decoupled from the housing by means of an elastic element, which surrounds the separating element in the peripheral direction.

Reference has already been made to the advantages of such a design of the motor vehicle or of the bearing system. Both the motor vehicle and the bearing system can be developed further in accordance with the preceding statements, so that reference is made in this respect to said statements.

BRIEF DESCRIPTION OF THE DRAWINGS

The invention will be explained in detail below on the basis of the exemplary embodiments illustrated in the drawing, without any limitation of the invention thereby occurring. Shown herein are.

DETAILED DESCRIPTION OF THE DRAWINGS

Figure 1:
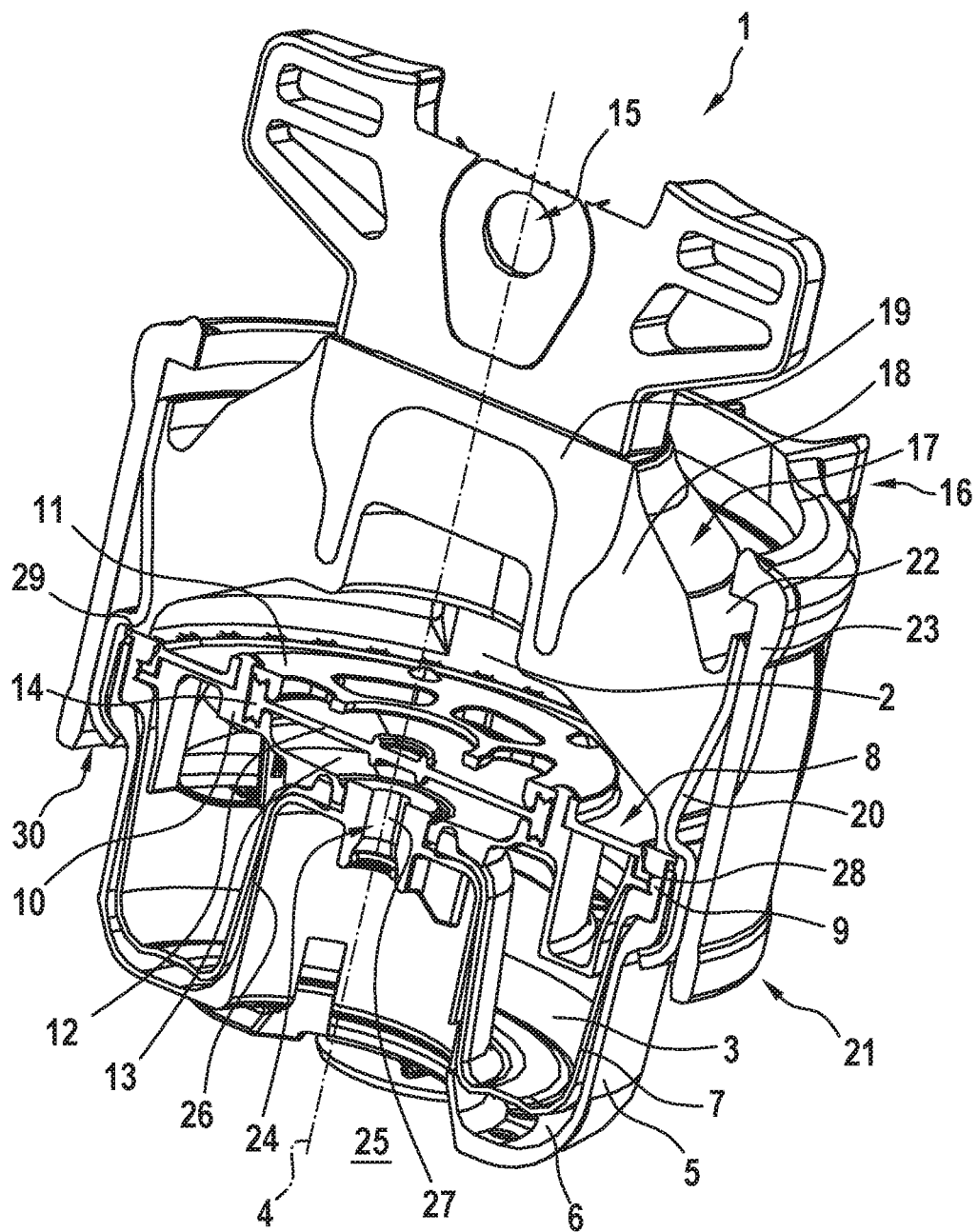
FIG. 1 a longitudinal sectional illustration through a bearing system for bearing of a motor vehicle assembly at a motor vehicle body, and FIG. 2 a detailed illustration of a region of the bearing system.

FIG. 1 shows a longitudinal sectional illustration through a bearing system 1. Said bearing system serves, for example, for the damping connection between a motor vehicle assembly, in particular, an internal combustion engine, and another system, such as, for example, a motor vehicle body of a motor vehicle. The bearing system 1 has a fluid operating chamber 2 as well as a fluid equilibration chamber 3. A central longitudinal axis 4 of the bearing system 1, along which the longitudinal section is present, is indicated. The fluid operating chamber 2 and the fluid equilibration chamber 3 are in flow connection with each other by way of at least one fluid channel.

The fluid equilibration chamber 3 is arranged in a cover 5 of the bearing system 1. For example, for this purpose, the cover 5 has an annular recess 6, in which the fluid equilibration chamber 3 is present. For creation of the fluid equilibration chamber 3, it can be provided that an elastic element 7, in particular, an elastomeric element, is arranged in the annular recess 6. Said elastic element can be fastened to a separating element 8 in a fluid-tight manner for creation of the fluid equilibration chamber 3. For example, the element 7 has a holding area 9, which is held by clamping between the separating element 8 and the cover 5.

The separating element 8 serves for separating the fluid operating chamber 2 and the fluid equilibration chamber 3. Accordingly, the separating element 8 is arranged between them. Situated in the separating element 8 is the at least one fluid channel, by way of which the fluid operating chamber 2 and the fluid equilibration chamber 3 are in flow connection, in particular, in permanent flow connection. For example, the separating element 8 is composed of a first part 10 and a second part 11. The second part 11 can be fastened to the first part 10; for example, it is riveted to the latter.

An elastic membrane 12 is held between the two parts 10 and 11 of the separating element 8, in particular, in a clamped manner. The membrane 12 serves for separating a fluid damping chamber 13 from the fluid operating chamber 2. For example, the fluid damping chamber 13 is formed in the separating element 8, in particular, in the first part 10 of the separating element 8, and is completely overlapped by the membrane 12. In this respect, the fluid damping chamber 13 is completely separated rheologically from the fluid operating chamber 2 as well as from the fluid equilibration chamber 3. The membrane 12 has, for example, an edge 14, which, on the one hand, engages in the first part 10 and, on the other hand, engages in the second part 11 of the separating element 8. The second part 11 of the separating element 8 is designed to be permeable to fluid, so that a direct flow connection between the fluid operating chamber 2 and the membrane 12 is present.

The bearing system 1 has a first bearing point 15 as well as a second bearing point 16. For example, the motor vehicle assembly is fastened by way of the first bearing point 15 and the motor vehicle body is fastened by way of the second bearing point 16 to the bearing system 1, so that, afterwards, the motor vehicle assembly is connected to the motor vehicle body by way of the bearing system 1. The first bearing point 15 is present at a bearing cap 17, which has a spring element 18, in particular an elastomeric element. The spring element 18 is connected by way of a bearing core 19, for example, to the first bearing point 15. Obviously, as a departure from the embodiment illustrated here, it is also possible for the first bearing point 15 to be present directly at the bearing core 19.

The spring element 18, together with the separating element 8, bounds the fluid operating chamber 2. In particular, the spring element 18 has a recess, which the separating element 8 engages over or closes. The bearing core 19 is preferably embedded in the spring element 18; in particular, it is cast in said spring element. The spring element 18 is connected by means of a supporting part 20 or a clamp, for example, to the cover 5. The cover 5 and the supporting part 20 form a housing 21 of the bearing system 1.

For example, the spring element 18 is fastened, via the supporting part 20, in a guide recess 22 of a guide device 23. By use of the guide device 23, it is possible, in particular, to prevent any buckling of the spring element 18 in the radial direction. The guide device 23 is preferably fastened to the motor vehicle body. The second bearing point 16 can be present at the guide device 23. In this case, the guide device 23 is preferably connected rigidly to the housing 21, in particular, to the supporting part 20 and/or to the cover 5.

In order to improve further the damping effect of the bearing system 1 or to prevent any undesired noise generation, the fluid damping chamber 13 is in flow connection, via a throttle channel 24, with an outer surrounding 25 of the bearing system 1. For example, the cover 5 has a projection 26, which is surrounded annularly by the fluid equilibration chamber 3, at least in some regions, and which projects in the direction of the fluid damping chamber 13. In the exemplary embodiment illustrated here, the cover 5 has a flow channel 27, which is preferably formed in the projection 26.

In the embodiment illustrated here, it is clear that the separating element 8 is decoupled from the housing 21, in particular from the cover 5 and the supporting part 20, by means of the elastic element 7. For this purpose, the elastic element 7 preferably completely surrounds the separating element 8 in the peripheral direction with respect to the central longitudinal axis 4. For example, the elastic element 7 has a separating-element receiving groove 28, which is preferably directed continuously in the peripheral direction. The separating element 8 engages in the separating-element receiving groove 28. In particular, it is provided that both the first part 10 and the second part 11 of the separating element 8 engage in the separating-element receiving groove 28. Consequently, on account of the elastic effect of the elastic element 7, the two parts 10 and 11 are forced against each other and, in addition, held against each other.

In order to achieve a reliable fastening of the supporting part 20 to the cover 5, the cover 5 overlaps the separating element 8, at least in some regions, as viewed in the axial direction. For example, the cover 5 extends in the axial direction from the fluid equilibration chamber 3 in the direction of the fluid operating chamber 2 all the way over the separating element receiving groove 28 and/or the second part 11 of the separating element 8 and hence is arranged in overlap with the separating element receiving groove 28 and/or the second part 11 of the separating element 8 in the axial direction.

Preferably, it is provided that both the separating element 8 and the cover 5 consist of a stiff material. In this respect, the elastic element 7, in particular, the holding area 9 thereof, is reliably held by clamping between the cover 5 and the separating element 8. It can be provided that the elastic element 7 or the holding area 9 thereof has a radial projection 29, which extends outward in the radial direction. Especially preferred, the radial projection 29 here engages between the cover 5 and the supporting part 20. For example, the radial projection 29 rests, on the one hand, against the cover 5 and/or, on the other hand, against the supporting part 20; in particular, it is held by clamping between the cover 5 and the supporting part 20.

The supporting part 20 is arranged overlapping with the cover 5, as viewed in the axial direction. Especially preferred, in this case, the supporting part 20 rests directly against the cover 5 and is fastened to said cover by means of a rear engagement connection 30. Owing to the fact that the cover 5 and the supporting part 20 rest directly against each other, an especially stable and durable connection between these two elements is created. It is especially advantageous here when the spring element 18 is arranged spaced apart from the elastic element 7 or the holding area 9 thereof in the axial direction or is arranged flush with it, but is not arranged overlapping in the axial direction. Accordingly, as viewed in the radial direction, the spring element 18 is not present between the cover 5 and the supporting part 20.

Figure 2:
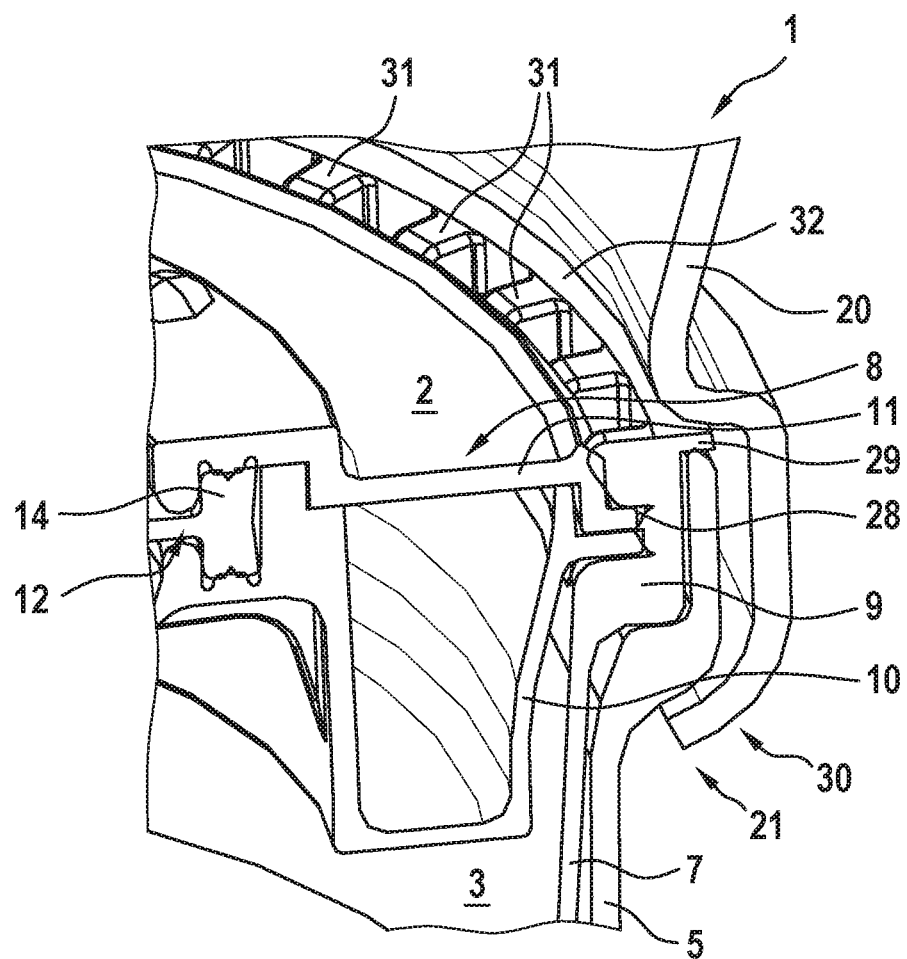

FIG. 2 shows a detailed sectional illustration of the bearing system 1. Clearly seen are the above-described aspects of the bearing system 1, in particular, the decoupling of the separating element 8 from the housing 21, in the form of the cover 5 and of the supporting part 20. In addition, it can be seen that the elastic element 7 has crosspieces 31, which are spaced apart from one another in the peripheral direction and extend in the direction of the separating element 8 or rest against it, only some of which are marked by way of example. The crosspieces 31 originate, for example, from a base body 32 of the elastic element 7 and extend inward in the radial direction. It can be provided that the separating-element receiving groove 28 is present only in the crosspieces 31, that is, it does not engage in the base body 32 or is present spaced apart from it in the radial direction. Alternatively, it can obviously be provided that the separating-element receiving groove 28 passes completely through the crosspieces 31 in the radial direction and projects into the base body 32.

Owing to the decoupling of the separating element 8 from the housing 20 by means of the elastic element 7, an outstanding damping effect is achieved. This damping effect can be adjusted via the material properties of the elastic element 7, such as, for example, the Shore hardness of the material. The elastic element 7 here is preferably composed of an elastomer. Additional parameters influencing the damping properties are the distance in the radial direction between the separating element 8 and the housing 21 as well as the number and/or the separation of the crosspieces 31. Additional possibilities thereby ensue for tuning the bearing system 1 in a way that is simple to implement.

The invention claimed is:

1. A bearing system comprising:
in particular for bearing a motor vehicle assembly at a motor vehicle body, a fluid operating chamber that is in flow connection, by way of at least one fluid channel, with a fluid equilibration chamber, which is present in a housing of the bearing system, wherein the fluid operating chamber and the fluid equilibration chamber are separated by a separating element, in which the at least one fluid channel is present, wherein the separating element is decoupled from the housing by means of an elastic element, which surrounds the separating element in the peripheral direction, wherein the housing has a cover, which accommodates the fluid equilibration chamber, and a supporting part, which holds a spring element of the bearing system, wherein the cover engages between the supporting part and the elastic element in such a way that, as viewed in the radial direction with respect to a central longitudinal axis of the bearing system, the elastic element, the cover, and the supporting part follow one another in succession, wherein an elastic membrane is fastened to the separating element, which membrane separates a fluid damping chamber rheologically from the fluid operating chamber, wherein the fluid damping chamber is in flow connection, by way of a throttle channel, with an outer surrounding of the bearing system, wherein the fluid damping chamber is arranged in the separating element, and wherein the throttle channel is arranged in a protrusion, which is at least annularly encompassed by the fluid equilibration chamber and protrudes towards the separating element.

2. The bearing system according to claim 1, wherein the elastic element, together with the separating element, encloses the fluid equilibration chamber.

3. The bearing system according to claim 1, wherein the separating element is fastened to the housing by way of the elastic element.

4. The bearing system according to claim 1, wherein the spring element is fastened, by way of the supporting part, in a guide recess of a guide device, wherein the supporting part engages between the guide device and the cover in such a way that, as viewed in the radial direction with respect to the central longitudinal axis, the elastic element, the cover, the supporting part, and the guide device follow one another in succession.

5. The bearing system according to claim 1, wherein the elastic element is arranged between the cover and the supporting part, in particular, in a clamped manner.

6. The bearing system according to claim 1, wherein the supporting part engages over the cover in the axial direction in some regions and is fastened in a form-fitting manner to the cover.

7. The bearing system according to claim 1, wherein the elastic element has a separating-element receiving groove for the separating element.

8. The bearing system according to claim 1, wherein the separating element has a first part and a second part, wherein the two parts are fastened to each other, and/or both of them engage in a separating-element receiving groove.

* * * * *